Patented May 11, 1943

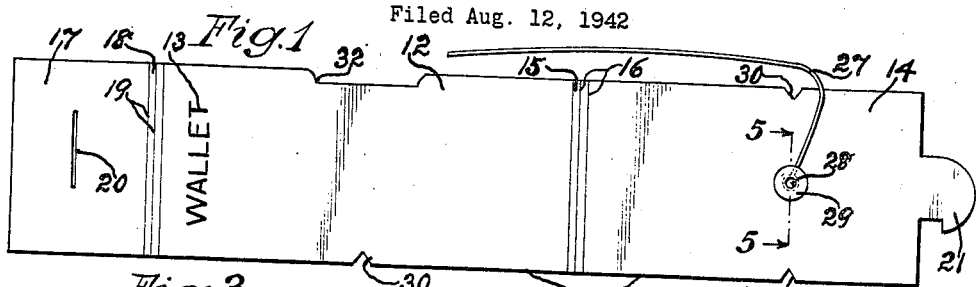
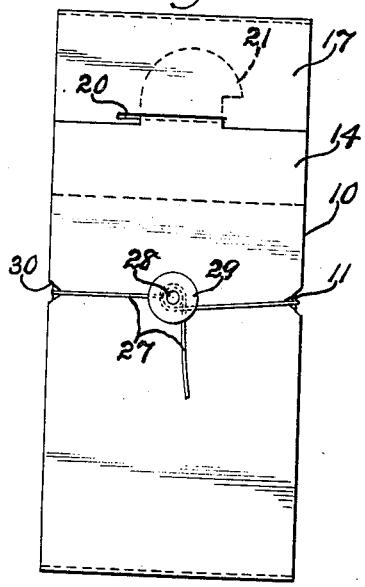
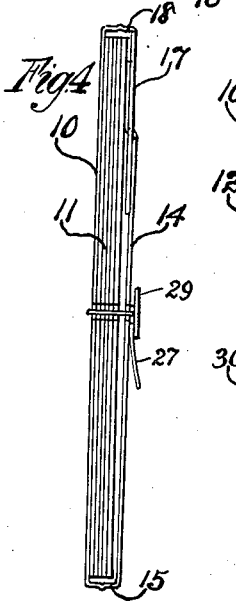
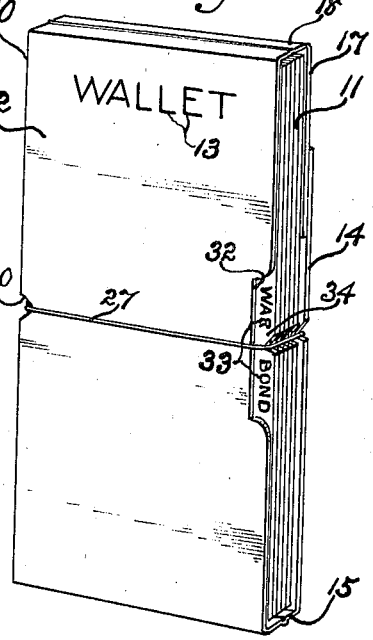
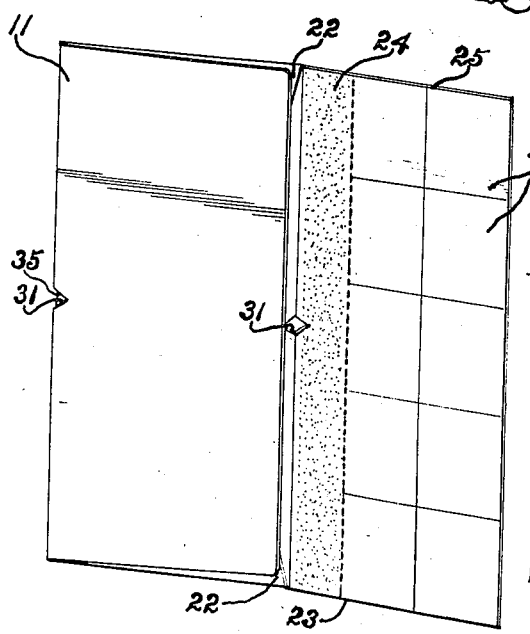
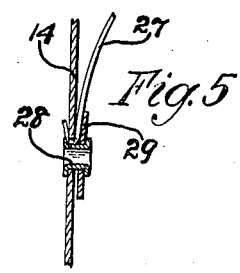

2,318,677

UNITED STATES PATENT OFFICE 2,318,677

WAR BOND CREDIT RATION WALLET WITH ENVELOPES

Louis E. Delson, Chicago, Ill.

Application August 12, 1942, Serial No. 454,508

3 Claims. (Cl. 129—15)

This invention pertains to a novel and beneficial war bond credit ration wallet with envelopes.

The essential object of this invention is to provide a highly useful combination means or device, which is preferably in the form of an expandable wallet or folder provided with a plurality of particularly constructed envelopes carried therein, all arranged and adapted for accumulating and storing war bonds, war savings stamps, merchandise credit stamps, and the like; the interior of each envelope is to hold war saving stamp books and war bond certificates, and in conjunction therewith the envelope flap or extended flaps will have merchandise credit stamps affixed thereto. The credit stamps are to be used in conjunction with the purchase and re-purchase of war savings stamps and war bonds, to greatly stimulate and enhance their sale. Credit ration stamps are connected or coupled as part of government supervised agreements with manufacturers and dealers of various articles and machines, so that the purchaser receives, in lieu of present delivery of such purchased articles and machines, their value in war bonds and war savings stamps and credit ration stamps; in order to obtain certain priority rights for the delivery of such articles or machines from such manufacturers or dealers promptly after the war.

Another object of this invention is to provide such a wallet together with a plurality of credit ration envelopes therein, each envelope being especially arranged and adapted as a credit ration merchandise purchase instrument, to receive a plurality of coupons or merchandise credit stamps on the flap or flaps, whereby a dealer in washing machines, refrigerators, automobiles, typewriters and the like, can provide immediate purchasing opportunities at prewar frozen price, style and quality, or better; and at present receiving in payment therefor war bonds, war savings stamps and merchandise credit ration stamps, in lieu of cash payment, so that the merchandise can be delivered by the dealer to the envelope holder, upon the conclusion of the war, in numbered order as registered with the government credit ration office.

It is apparent that this will create an incentive for the increased buying of war savings stamps and war bonds now, thereby aiding the war effort, while also buying merchandise for future delivery, thereby avoiding inflation now and any depressing effect after the war, and also giving the manufacturer concrete assurance of returning to his field of manufacture after the war, thus freeing himself for present all out war production; enabling himself to hold his dealer organization together, also giving the dealer salesman the paid expert job of selling war bonds as well as credit ration merchandise stamps to provide for the first time a national trained paid sales force for the sale of war bonds, such payment to come from the simultaneous sale of merchandise or machines for peacetime delivery.

These and various other objects and advantages are attained with this invention, as will become apparent from the following description, taken in connection with the accompanying drawing in which the invention is shown in its preferred form, it being evident that other arrangements and forms of construction may be resorted to for carrying out the objects and purposes of this invention.

In the drawing:

Fig. 1 is a plan view showing the outside of this wallet unfolded and consisting of one piece of material.

Fig. 2 is a perspective view of this device showing the front face of the wallet together with the envelopes secured therein.

Fig. 3 is a plan view showing the rear face of the wallet with the envelopes secured therein.

Fig. 4 is a side view of the wallet with the envelopes therein.

Fig. 5 is an enlarged sectional view of the fastening means, taken on line 5—5 of Fig. 1.

Fig. 6 shows one of the envelopes with its closure flap open and being sufficiently large and sectioned for receiving thereon a plurality of merchandise credit stamps.

In the drawing this invention is illustrated in its preferred form and as comprising a wallet or holder 10 and a plurality of envelopes 11 carried therein, all being of proper size and shape to have war bonds and saving stamp books placed and stored in the envelope pockets and to have merchandise credit stamps secured to the flaps of said envelopes.

The wallet 10 is preferably made of semi-rigid material, and it includes a portion or section 12 which provides the front side or face adapted to bear thereon a suitable title or legend 13, and it also includes a rear portion or section 14. These two sections may be made as separate or as unitary parts, and are shown herein as being united by an end part 15 which is creased along the lines 16 to facilitate expansion and contraction of the wallet. A tab 17 extends from the other end part 18 of this wallet, being integral with said section 12 and creased along lines 19; and a slot 20 is provided in this tab 17 for receiving a hooked end or tongue 21 which projects from the section 14.

This arrangement thus provides a wallet which is shown as closed at both ends, but is open at both sides. The wallet may also be made without the tab 17 and the tongue 21 thus leaving it open at an end, since particular fastening means around the wallet will secure the envelopes therein, as will be apparent from the following description.

The envelopes 11 used in this combination means comprise each an envelope which is of proper shape and size to contain war bonds therein, and each envelope comprises a pair of expandable ends 22, and also a closure flap 23 at its side which is of special construction and includes a contiguous gummed portion 24 and beyond that an enlarged portion or page 25 which is sectioned into a plurality of spaces 26 adapted to have attached onto each thereof a merchandise credit stamp which is obtained from a manufacturer or dealer of the same. These spaces 26 are shown as being ten herein, for receiving ten credit stamps thereon, each credit stamp being added upon proof that the holder has purchased war savings stamps or war bonds; and it is also apparent that these spaces will vary in number to suit the particular occasion, and that similarly a plurality of such portions or pages 25 may be provided for the envelope, in conjunction with this one flap 23 or in lieu thereof.

These envelopes 11 are arranged to have the merchandise credit stamps placed upon the spaces 26 of the flap portion 25, and the envelopes are further adapted to receive the war bonds and likewise the war savings stamps therein, and can also receive and store the customary booklets.

Fastening means is provided for securely retaining the envelopes with their contents in the wallet, and such means comprises a band or cord 27 which has one end secured onto the wallet, as for instance by a button or element 28, and is adapted to be wound around the wallet and have its other or free end part turned around the shank of said button and then held clasped under its outer part or head 29.

It should be observed that this fastening means furthermore includes corresponding notches 30 and 31 provided in similar positions on the wallet 10 and the envelopes 11. These notches 30 and 31 are preferably provided on said wallet and on each of said envelopes in the form of pairs having the two notches of each pair oppositely placed on the two opposite edge portions of each envelope and the wallet, and so that all said pairs of notches will register, substantially as indicated in the drawing. The band 27 is then wound around the wallet so that it will engage in all of said notches 30 and 31. This arrangement will secure the contained envelopes in place in the wallet and will prevent them from sliding longitudinally of each other or in the wallet, even if its tongue 21 is unlatched or it and the end tab 17 are injured or entirely omitted.

The notches 30 on this wallet include an enlarged notch 32, provided to facilitate reading the title or legend 33 which appears on the underlying side edge part 34 of the envelope; while the notches 31 on the side edges of the envelopes also enable one to observe whether there are contents 35 in the envelopes or not. The envelopes may also be withdrawn from this wallet by simply loosening the band 27, and may be moved apart so the titles can be readily observed, without any need of opening the end tongue and flap herein, which altogether greatly facilitates the use and handling of this combination device.

I claim:

1. The combination of a wallet and envelopes carried therein, all of proper shape and size to store war bonds in said envelopes, said wallet and said envelopes being provided each with a pair of notches on the opposite side edge parts and positioned to bring said pairs of notches in register, said notches being arranged to facilitate observing if there are contents in said envelopes and the wallet consisting of a substantially rectangular sheet of material folded over to provide front and rear and end parts and being open at the sides to facilitate observing the carried envelopes and withdrawing the same, and fastening means including a band and an element securing one end thereof onto the wallet, said band being positioned to be engaged in all of said notches and wound around the wallet and have its outer end detachably engaged onto said element, thereby securing the envelopes with their contents in the wallet and preventing them from moving longitudinally of the wallet, and one of the notches in a side edge part of the wallet being enlarged to enable observing any legend placed on the underlying edge part of the adjacent envelope.

2. The combination of a wallet and envelopes carried therein, all of proper shape and size for storing war bonds in said envelopes, said envelopes being provided each with expansible ends and with a closure flap at the side including a gummed portion for sealing the envelope and also beyond that an enlarged portion provided with a plurality of sectioned areas adapted each to have a merchandise credit stamp secured thereon, the wallet and the envelopes being provided each with a pair of notches on its opposite edge parts and positioned to bring said pairs of notches in register, said notches being arranged to facilitate observing whether there are contents in the envelopes, and fastening means including a band and an element securing one end thereof onto the wallet and positioned to be engaged in all of said notches and wound around the wallet and have its outer part engaged onto said element, thereby securing the envelopes with their contents firmly in the wallet.

3. The combination of a wallet and envelopes carried therein, all of proper shape and size for storing war bonds in said envelopes, said wallet consisting of a substantially rectangular sheet of material folded over and providing front and rear parts which are integral at one end part and which include cooperating means for detachably closing the other end part, the sides of the wallet being open, the wallet and the envelopes being provided each with a pair of notches on the edge parts and positioned to bring all the pairs of notches in register, and fastening means including a band and an element securing one end thereof onto the wallet and positioned to engage in all of said notches and wound around the wallet and have its outer part engaged onto said element, thereby securing the envelopes with their contents firmly in the wallet and preventing any movement of the envelopes longitudinally of the wallet even tho said detachable end closing means is open or inoperative.

LOUIS E. DELSON.